US007147149B2

(12) United States Patent
Giraldin et al.

(10) Patent No.: US 7,147,149 B2
(45) Date of Patent: Dec. 12, 2006

(54) CASHLESS SPENDING SYSTEM AND METHOD

(75) Inventors: Timothy W. Giraldin, Ladera Ranch, CA (US); Patrick W. Giraldin, Ladera Ranch, CA (US); Regan E. Kelly, Laguna Niguel, CA (US); Martin F. Crowley, Lake Forest, CA (US); Eric Couch, Trabuco Canyon, CA (US); Y-Tin Gross, Ladera Ranch, CA (US)

(73) Assignee: Safetzone Technologies Corporation, Laguna Hills, CA (US)

( * ) Notice: Subject to any disclaimer, the term of this patent is extended or adjusted under 35 U.S.C. 154(b) by 0 days.

(21) Appl. No.: 10/716,802

(22) Filed: Nov. 18, 2003

(65) Prior Publication Data

US 2004/0107162 A1    Jun. 3, 2004

Related U.S. Application Data

(60) Provisional application No. 60/427,901, filed on Nov. 19, 2002, provisional application No. 60/427,874, filed on Nov. 19, 2002, provisional application No. 60/427,875, filed on Nov. 19, 2002, provisional application No. 60/427,731, filed on Nov. 19, 2002, provisional application No. 60/427,713, filed on Nov. 19, 2002.

(51) Int. Cl.
*G06K 5/00*  (2006.01)

(52) U.S. Cl. ............... 235/380; 235/375; 340/10.1; 340/572.1

(58) Field of Classification Search ............. 235/379, 235/380, 375, 451; 701/209; 705/44, 26; 340/572.1, 572.2, 572.4, 10.1
See application file for complete search history.

(56) References Cited

U.S. PATENT DOCUMENTS

| 4,495,496 | A | 1/1985 | Miller, III |
|---|---|---|---|
| 5,438,321 | A | 8/1995 | Bernard et al. |
| 5,566,327 | A | 10/1996 | Sehr |
| 5,987,421 | A | 11/1999 | Chuang |
| 6,052,675 | A | 4/2000 | Checchio |
| 6,173,269 | B1 * | 1/2001 | Solokl et al. ............ 705/35 |
| 6,189,783 | B1 * | 2/2001 | Motomiya et al. ....... 235/375 |
| 6,657,543 | B1 | 12/2003 | Chung |
| 6,796,497 | B1 * | 9/2004 | Benkert et al. .......... 235/380 |
| 2002/0143550 | A1 * | 10/2002 | Nakatsuyama .......... 704/270.1 |
| 2002/0152120 | A1 | 10/2002 | Howington |

* cited by examiner

*Primary Examiner*—Ahshik Kim
*Assistant Examiner*—Daniel A. Hess
(74) *Attorney, Agent, or Firm*—Duckor Spradling Metzger & Wynne; Bernard L. Kleinke

(57) ABSTRACT

A method and system are disclosed for the communication for a confined area of a facility. Personal identification information of a group member into at least one of a set of stations distributed throughout the confined area. Monetary deposit information for the member group is received, and transaction information is received from at least one cashless station. Transaction reports are created.

21 Claims, 8 Drawing Sheets

CashlessSystem

CASHLESS SPENDING SYSTEM AND METHOD

RELATED APPLICATION

The following applications are related to the present invention and are hereby incorporated by reference in their entirety: U.S. patent application, Ser. No. 09/992,872, titled "IDENTIFICATION TAG FOR REAL-TIME LOCATION OF PEOPLE," filed Nov. 13, 2001, and U.S. patent-application, Ser. No. 09/992668, filed Nov. 13, 2001 and titled "SYSTEM FOR REAL-TIME LOCATION OF PEOPLE IN A FIXED ENVIRONMENT."

This application claims priority to the following provisional applications and are hereby incorporated by reference in their entirety: U.S. Provisional Patent Application, Ser. No. 60/427,901, titled MESSAGE COMMUNICATION SYSTEM AND METHOD, filed Nov. 19, 2002, U.S. Provisional Patent Application, Ser. No. 60/427,874, titled QUEUE MANAGEMENT SYSTEM AND METHOD, filed Nov. 9, 2002, U.S. Provisional Patent Application, Ser. No. 60/427,875, titled ROUTE PLANNING SYSTEM AND METHOD, filed Nov. 19, 2002, U.S. U.S. Provisional Patent Application, Ser. No. 60/427,731, titled CASHLESS SPENDING SYSTEM AND METHOD, filed Nov. 19, 2002, and U.S. Provisional Patent Application, Ser. No. 60/427,713, titled DATA ANALYSIS SYSTEM AND METHOD, filed Nov. 19, 2002.

This application claims priority to the following non-provisional applications and are hereby incorporated by reference in their entirety: U.S. Non-provisional patent application, Ser. No. 10/716,583, titled MESSAGE COMMUNICATION SYSTEM AND METHOD, filed Nov. 18, 2003, U.S. Non-provisional patent application, Ser. No. 10/717,052, titled QUEUE MANAGEMENT SYSTEM AND METHOD, filed Nov. 18, 2003, U.S. Non-provisional patent application, Ser. No. 10/716,800, titled ROUTE PLANNING SYSTEM AND METHOD, filed Nov. 18, 2003.

BACKGROUND OF THE INVENTION

1. Field of the Invention

The present invention relates in general to a cashless spending system and method. It more particularly relates to such a cashless spending system and method, which are particularly useful in a confined area of a facility such as an amusement park, theme park, large retail store, ship, or other.

2. Background Art

The information contained in this section relates to the background of the art of the present invention without any admission as to whether or not such background art legally constitutes prior art.

In certain environments, such as amusement parks, theme parks or other such facilities, there-ordinarily are a variety of attractions, as well as park amenities, such as restaurants, gift shops and other facilities where guests can make purchases during a given interval at time such as during the time when the person or persons are visiting the facility. Frequently, groups of people, such as families, attend facilities such as amusement parks or the like, and each member of the group will have a certain amount of cash or otherwise budget a certain amount of money to buy various services and products during the stay in the facility.

Thus, people are required to carry cash with them, during the day's events for many of the amenities. Also, some of the people in the group may be younger children who may either stray from their parents or attend other attractions or amenities throughout the facility and are thus separated from their parents or other members of his or her group during those periods of time. During such time of separation, the children may or may not have cash to make purchases.

Moreover, it is often times desirable for the group to limit their expenditures during the day for budgetary purposes. This is not always convenient or possible when the group divides up and separates during the day. Cash carried by the individuals can be lost, especially where the attractions include fast moving rides, thereby making it more difficult to make purchases in the confined environment of the facility.

BRIEF DESCRIPTION OF THE DRAWINGS

In the following is a brief description of the drawings:

FIGS. 4–8 are screen shot diagrams of the system of FIG. 1.

DESCRIPTION OF CERTAIN EMBODIMENTS OF THE INVENTION

A method and system are disclosed for the communication for confined areas of a facility. Personal identification information of a group member into at least one of a set of stations distributed throughout the confined area. Monetary deposit information for the member group is received, and transaction information is received from at least one cashless station. Transaction reports are created.

In accordance with a disclosed embodiment of the invention, there is provided a cashless spending system and method, which relates to registering an amount of money to be spent during a given interval of time such as during one day, providing an identification tag or tags for one or more persons in a group, and permitting the use of the identification tags with readers to record the amount of purchases during the interval of time allotted so that payment can be made at the end of the allotted time.

According to another aspect of a disclosed embodiment of the invention relates to the use of a registration station where guests in an amusement park or other facility can establish a cashless spending account for one or more persons in a group, a group of personal identification tags provided to individual members of the group, and a group of readers distributed throughout the geographical areas such as the park grounds at the facilities where purchases may be made.

Person Locating System

Many patrons who visit large confined commercial facilities of a facility such as zoos, waterparks, theme parks, amusement parks, large retail stores, casinos, ships and others have at some point, experienced the feeling of temporarily losing another member of their group or family. It may be easy under some circumstances for an individual to become lost in a crowd, where the person only a short distance such as twenty feet away from the rest of the group and yet the group may not be able to find him or her.

Figure 1:
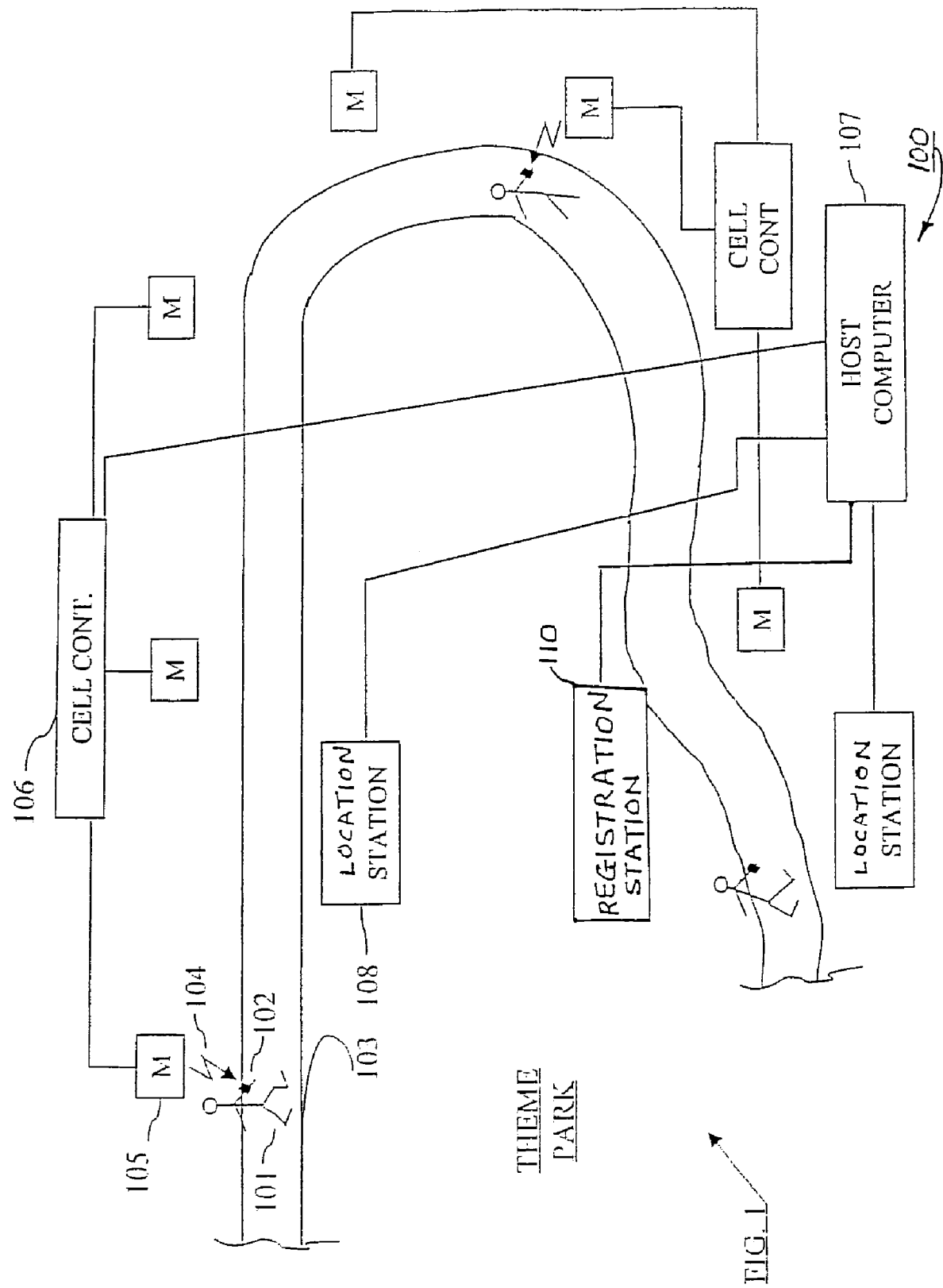
FIG. 1 is a diagrammatic view of a person locating system, which is constructed according to the disclosed embodiment of the invention.

As shown in FIG. 1, an interactive person locating system 100 employs location stations such as station 108 distributed throughout the confined area to facilitate communication between and among member of the groups of patrons such as patron 101. A registration station 110 enables patrons to register their group so that members of the registered group can communicate privately with one another.

Group members or guests who interact with the system, at any location station, have the ability to visually discover the location of their group members on an electronic version of the facility or park map.

The members or guests are thus empowered to become a part of the solution in finding one another; to give them the ability to at least know where the rest of the party is when they cannot be found, or when they become separated by choice or by accident; to eliminate the feeling of panic that sweeps over a parent when they realize that a member of their group, such as their child, is not by their side or at the designated meeting place.

It helps for group members such as parents to know promptly that their children are still in the park, waiting in line for a ride or just running late.

Each member of a group obtains a waterproof transmitter in the form of a locator or personal identification (i.d.) tag 102 that is worn on the wrist or other part of the body or on the person's clothing. This locator continually communicates, via radio signal, with the child locating system 10 to update his or her location throughout the day. One example of such a tag is disclosed in the foregoing mentioned non-provisional patent application Ser. No. 09/992,872.

The location station 108 is a strategically placed interactive viewable workstation kiosk. These stations allow unaided guest access to the system with the locator 102. This gives the guest the ability to locate and view any locators in their group, to post messages on a private message board or to contact security. It also allows users to interact with any other system feature of module.

The registration station 110 is an interactive viewable workstation used by the park. The registration station 110 software module activates the locating software by enabling quick and easy registration of groups and individuals into the system 100 so that the system distinguishes between groups and between individuals within groups.

The confined area such as a park is divided into zones. These zones are the areas inside the property where guests need to be located. A zone can be as large or as small as needed. They can also be adjusted, expanded or minimized as necessary.

Guests are tracked as they pass along a path 103 through these zones via antennas such as an antenna 105 that are strategically placed throughout the property. These antennas, in return, send the tracking information to cell controllers such as cell controller 106, which conveys the information back to the central processing server or host computer 107 utilizing a wireless network. One example of such a system for the real-time location of people in a fixed environment is disclosed in the foregoing mentioned non-provisional patent application Ser. No. 09/992,668.

A cashless spending system and method includes a software module to provide facility guests and group members with a method to eliminate or greatly reduce the need for cash anywhere in the facility. This module turns each i.d. tag such as the tag 102 into an "electronic wallet" that is associated with a unique "virtual account" within the system. The elimination of the necessity for cash transactions provides guests or group members with the freedom to utilize the services of the facility and make purchases at amenities such as restaurants, games and shops as well as transactions throughout the facility without the potential loss of wallets, pocketbooks, and cash.

The cashless spending system may be completely integrated with the person locating system 100, or can be partially integrated or operate in a stand alone manner. Guests can create their "virtual" account at a registration station such as registration station 110. These "virtual" accounts are debited with the use of selected I.D. tags or locators in the specified group, or individually. Guests and group members have the ability to check their account balance at any location station such as the location station 108. If necessary, the guest and group members can add more credit to their "virtual" account at the registration station.

Some features and benefits of the cashless spending system and method according to certain embodiments of the invention include the identification tag becoming an "electronic wallet" for park guests. For example, parents can provide their children "set" spending limits, and eliminate the need for carrying cash. The cashless module can be fully or partially integrated with current point of sale systems. Spending becomes more convenient for facility guests. For some applications, the cashless spending system may be seamlessly integrated into the locating system 100.

Figure 2:
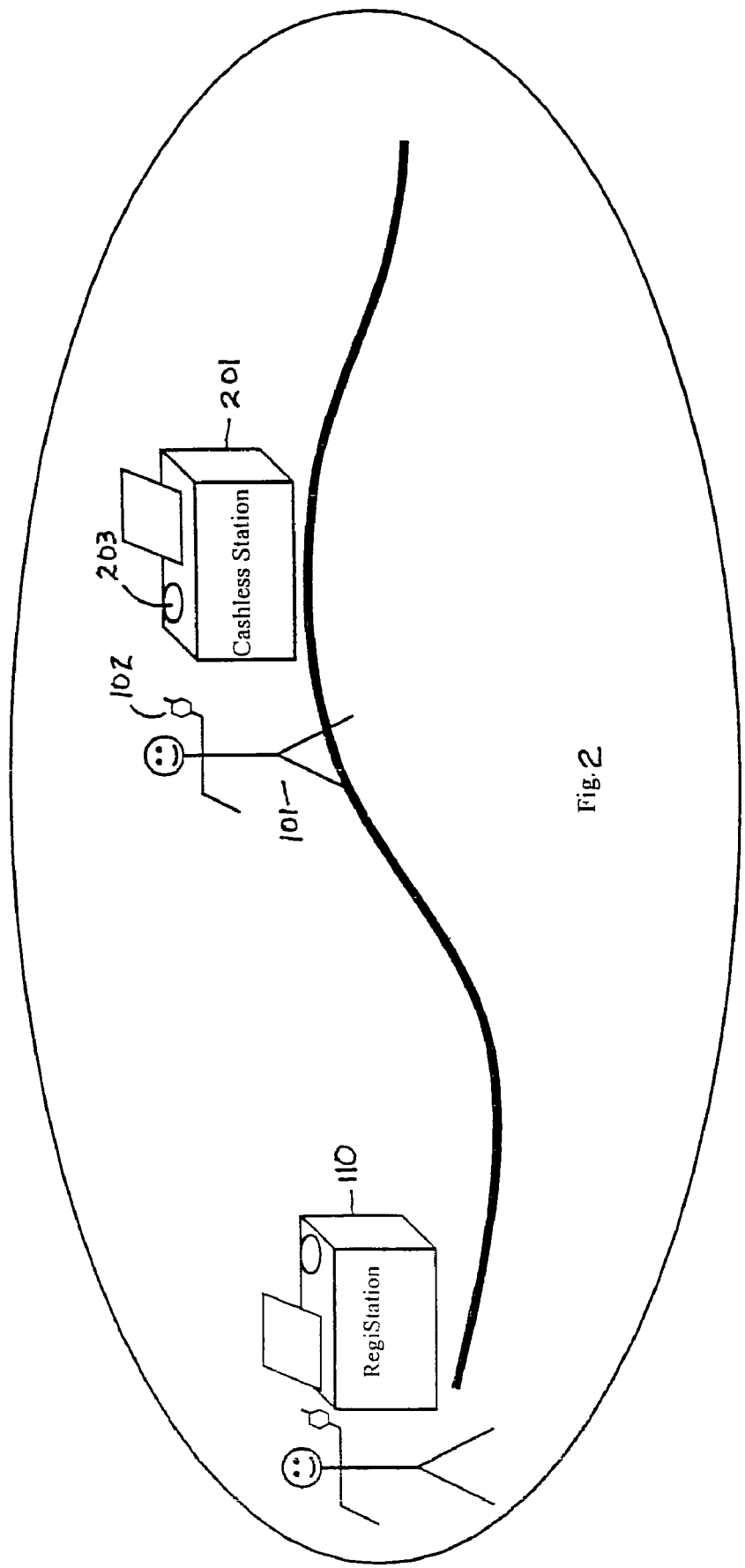
FIG. 2 is a diagrammatic view of a disclosed method of using a cashless spending system, utilizing the system of FIG. 1.

Referring now to FIG. 2, for some applications, the guest or group member may be required to be registered as a user via registration station 110 of the locating system 100 (FIG. 1) in order to use the cashless spending function. Guests or group members may acquire the cashless spending option at the registration station 110 when registering for the locating system 110.

Guests or group members then request that a certain dollar amount of funds be placed in the cashless account. Guests or group members may set spending limits per person in their group at time of activation at the registration station 110.

During the course of the day or other designated interval of time, guests or group members such as a group member 101 may then purchase at any cashless enabled sites such as a cashless station 201 in the confined area of the facility by scanning their i.d. tag 102 at the prescribed reader 203 at the point of purchase, or otherwise enter his or her personal identification information to access his or her cashless spending account. This purchase amount is sent to the data base, stored in the host computer 107 (FIG. 1) to make a determination of the approval or denial of the transaction based on the balance of funds indicated in the cashless system database.

Figure 3:
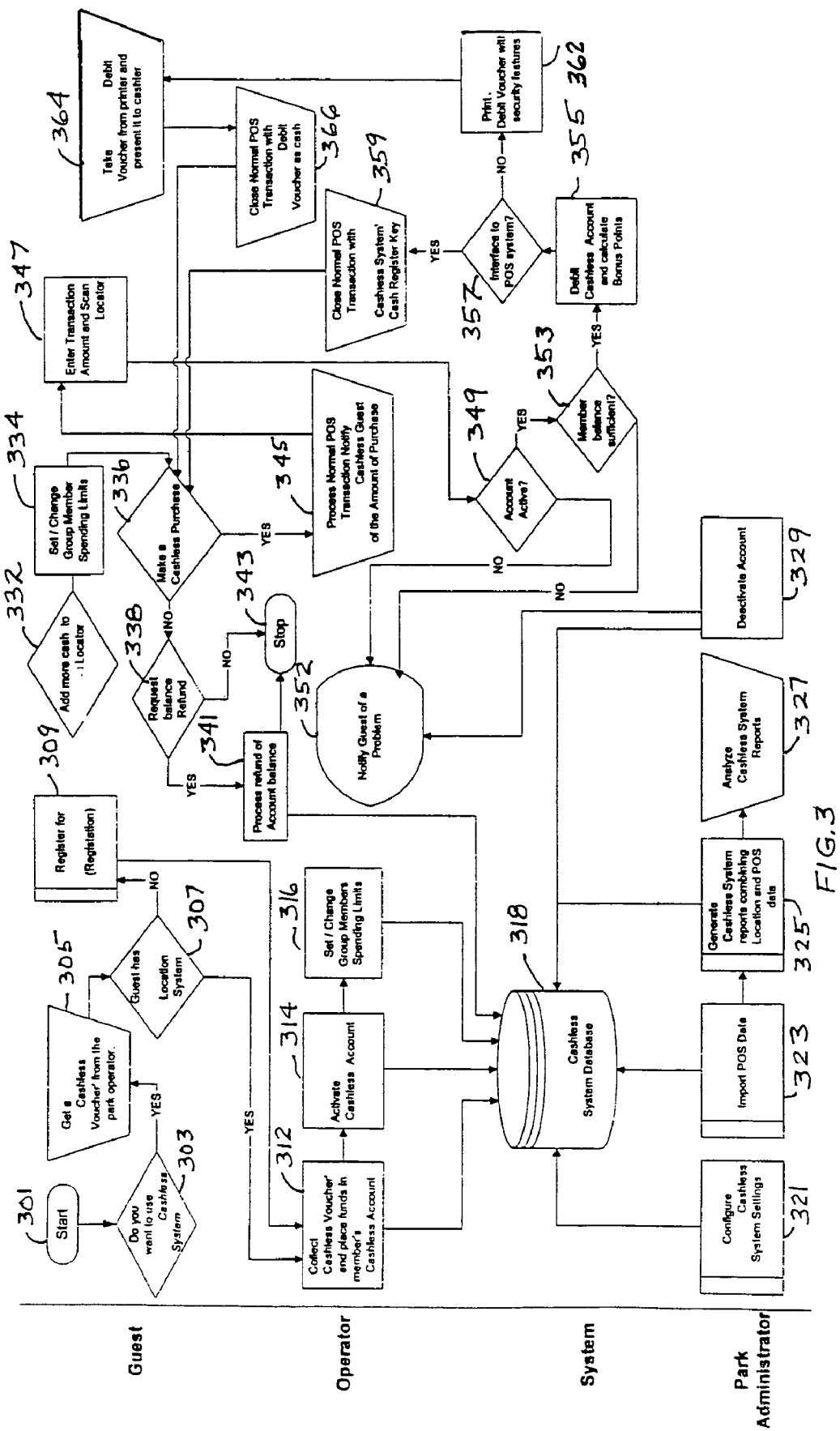
FIG. 3 is a flow chart diagram illustrating a software system and method in accordance with a disclosed embodiment of the present invention.

Referring now to FIG. 3, there is shown a software controlled system and method of the disclosed embodiment of the present invention for the cashless feature as disclosed herein. At the start of the process at box 301, a determination is made at box 303 as to whether or not the guest would like to have the cashless system. If the guest requires such a system, then as indicated at box 305, a cashless voucher is given to the guest or group member by the facility operator.

At box 307, it is determined whether or not the guest or group member has registered for the person locating system 100. If not, then at box 309 the guest or group member registers for the system 100 (FIG. 1). If the guest has already registered, then as indicated at box 312, the operator collects the cashless voucher and places funds in cashless account of the guest or group member. Also, the operator causes the activation of the cashless account as indicated at box 314, and sets or changes the group members' spending limits at box 316. All of this information is then recorded in the cashless system data base 318 which is stored in the host computer 107 on the system 100 (FIG. 1).

As indicated at box 321, the park administrator can configure the cashless system settings for the cashless system data base 318. Similarly, the facility administrator, as indicated at box 323, can import point of sale data for the cashless system data base 318, and can causes the generation of a cashless system report combining both the location and Point of sale data at box 325 for the cashless system data base 318. Also, as indicated at box 327, the facility administrator can analyze the cashless system reports. Additionally, the facility administrator can cause the deactivation of the account as indicated at box 329.

As indicated at box 332, the guest or group member can add additional cash to the locator or i.d. tag. As indicated at box 334, the guest or group member can set or change group member spending limits. As indicated at box 336, a guest or group member makes a decision as to whether or not to make a cashless purchase. If a cashless purchase is not desired, as indicated at box 338, it is determined whether or not a balance of the refund is requested. If it is, then at box 341, the refund of the account balance is processed and conveyed to the cashless system data base 318. If the balance of the refund is not requested, then the process stops as indicated at box 343.

As indicated at box 345, should the guest or group member desire to make a cashless purchase, a conventional point of sale transaction is processed and the operator notifies the guest or group member of the amount of the purchase. As indicated at box 347, the operator can enter the transaction amount and scan the locator or i.d. tag, such as the tag 102. The cashless system determines whether or not the account is activated at box 349. If it is not so activated, then the guest or group member is notified that there is a problem, and the facility administrator can deactivate the account, if necessary. If the account is active, then as indicated at box 353, it is determined whether the cashless account balance of the guest or member is sufficient or not. If it is not sufficient, then the guest or group member is notified of a problem. If it is sufficient, then as indicated at box 355, the cashless account is debited, and bonus points are calculated. As indicated at box 357, it is determined by the system 100 whether or not there is an interface to the point of sale system. If there is, then as indicated at box 359, the operator closes the conventional point of sale transaction with the cashless system and the cash register key. If there is not such an interface, then the system prints a debit voucher with security features as indicated at box 362. Furthermore, the guest or group member then takes the debit voucher from the printer (not shown) and presents it to a cashier as indicated at box 364. The operator, as indicated at box 366, closes the conventional point of sale transaction with the debit voucher as cash. Thereafter, the cashless purchase is completed as indicated at box 336.

Figure 4:
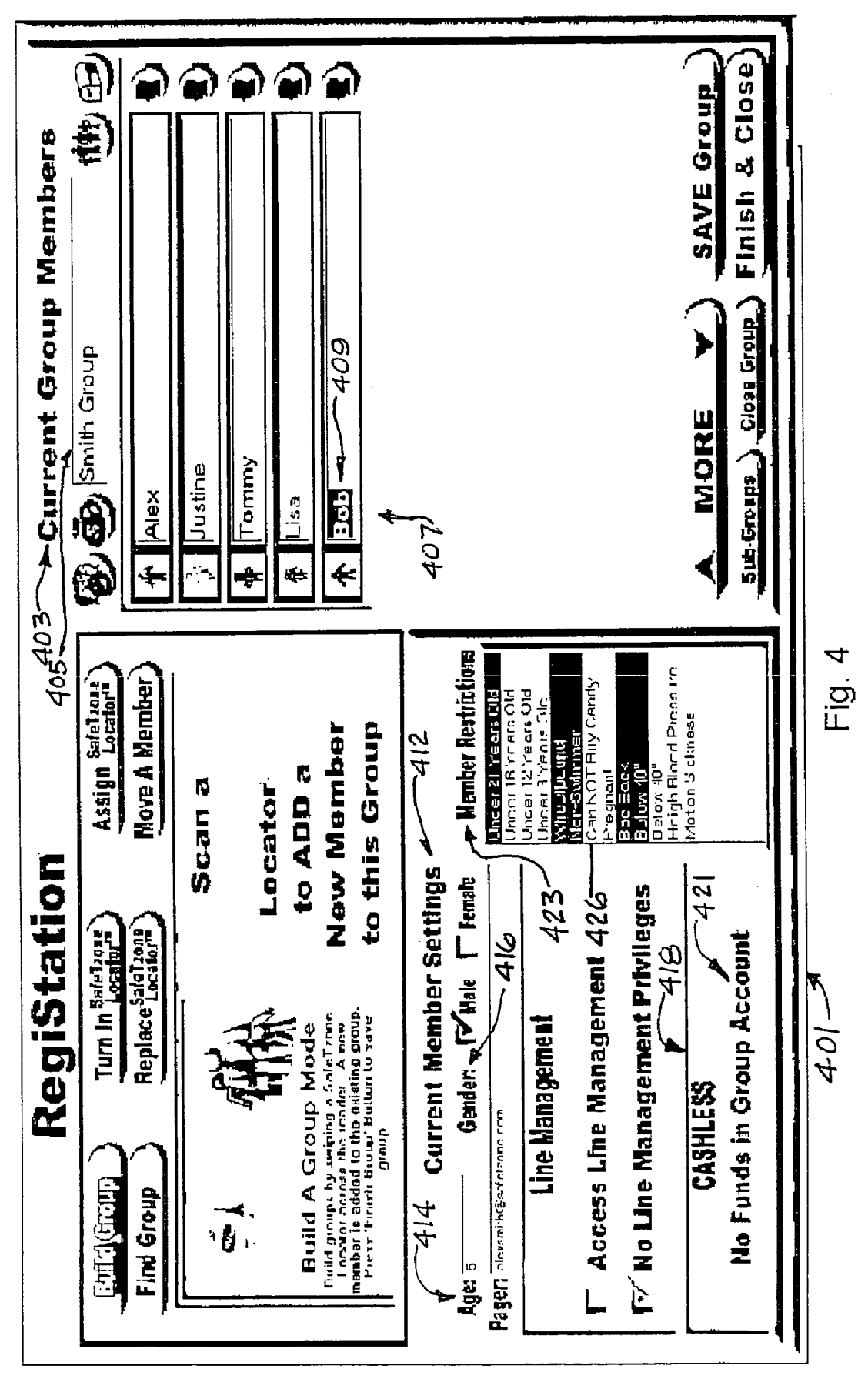

Referring now to FIGS. 4–8, the various displays before the cashless system. As shown in FIG. 4, a registration station screen 401 includes a current group member list 403 and a group name indication 405. A list 407 of the members of the named group are provided. The member names may be highlighted such as at 409 for the member "Bob." When highlighted, current member settings at 412 provide information regarding the highlighted number. Such information includes an age indicia 414, gender indicia 416, and a cashless indication box 418. The box 418 includes a cashless status indication 421 such as a message "No Funds in Group Account."

Additionally, there is a member's restrictions list 423 for designating any restrictions on purchases for group members. For example, an indication 426 is that this particular member cannot buy candy.

The screen 401 can be printed as a report from a registration station 110.

Figure 5:
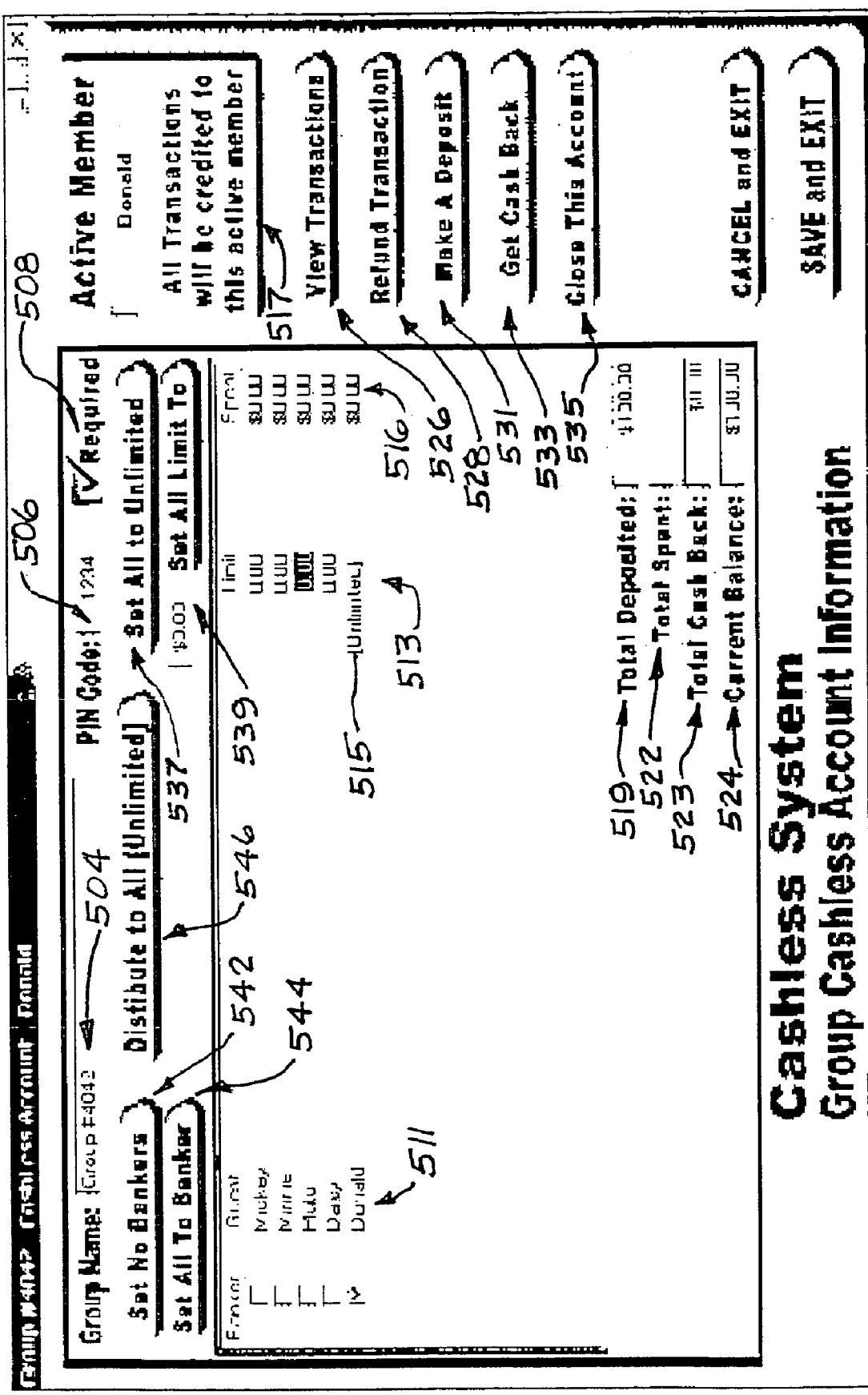

Referring now to FIG. 5, there is shown a screen 502 for a group cashless account information. The screen 502 includes a group name indication 504, a personal identification number (PIN) indication 506, and whether or not such information is required at indication 508.

The screen 502 includes a guest list indication 511, a spending limit list indication 513 which also includes whether or not there is unlimited spending such as at the "unlimited" indication 515. Additionally, there is a spent list indication 516.

At the active member box 517, the name of a group member is displayed as the member to whom all transactions will be credited. A total deposit indication is displayed at 519 to indicate the amount of the funds initially deposited by the group. A total spent indication is illustrated at 522, and a total cash back indication is shown at 523. A current balance indication is displayed at 524.

A view transactions button 526, when selected, enables the user to obtain more detailed information regarding each transaction.

A refund transaction button 528, when selected, enables the user to refund a transaction. A deposit button 531, when selected by the user, enables a deposit to be made to the account for the group.

When the cash back button 533 is selected, the Group can determine the amount of the cash back to the Group. A close account button 535 may be selected to terminate the account and render it inactive or closed.

A "Set All to Unlimited" button 537 may be selected to cause all of the members of the group to be designated as "Unlimited." When the "Set All Limit To Button 539 is selected, each one of the members of the group will be designated as requiring a limit to be entered.

A "Set No Bankers" button 542, when selected, prevents any of the members as being designated as a "Banker," as indicated in the active member box 517. Alternatively, when a button Set All To Banker button 544 is selected to cause each one of the members of the group to be designated as a "Banker," the determination of who is financially responsible for the payment of the transactions for the group may be facilitated.

Figure 6:
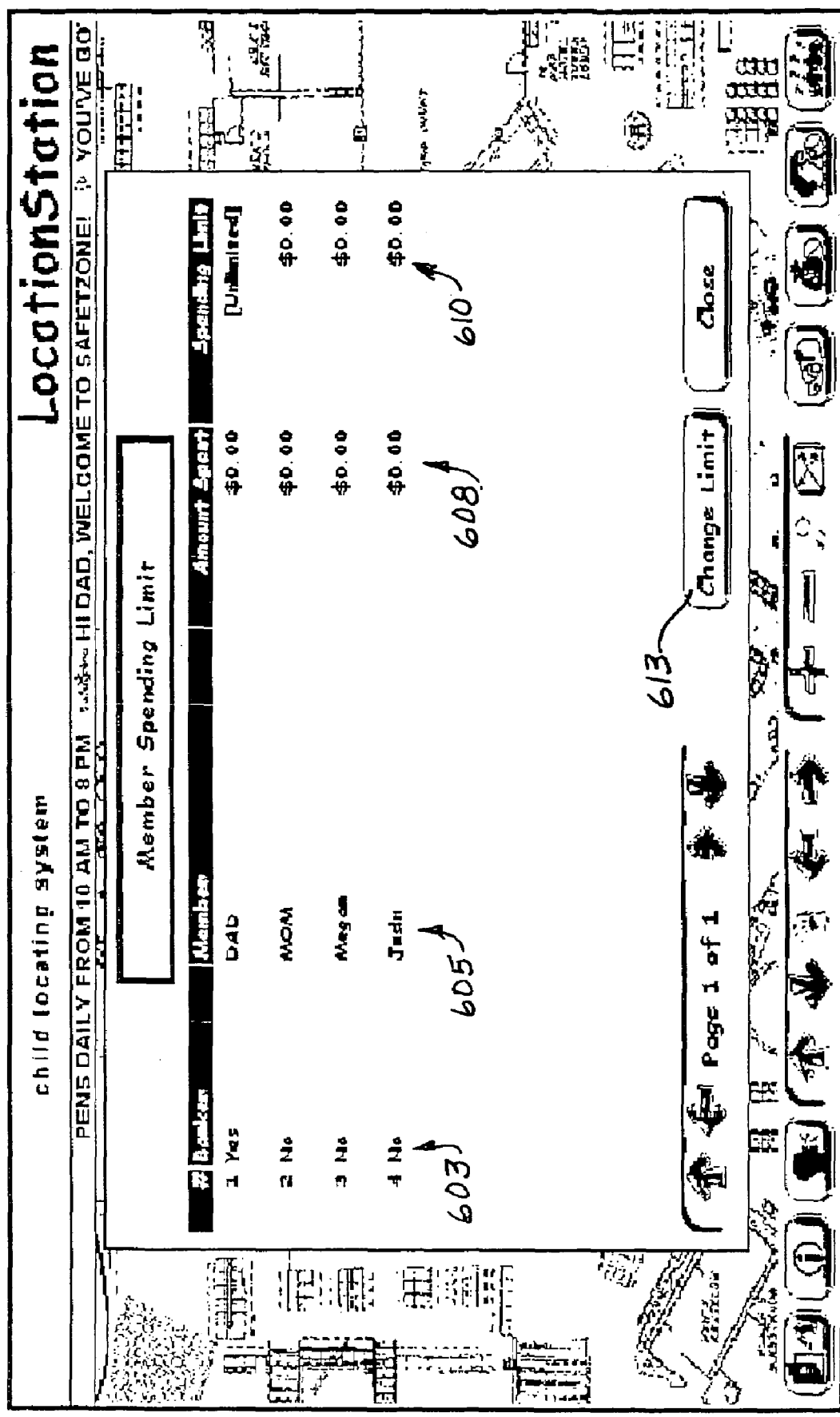

Referring now to FIG. 6, there is shown a member spending limit screen 601, which includes a banker list indication 603 to indicate which one or more of the group members is designated as the financially responsible person for the group. There is also included a member list indication 605, an amount spent indication 608 and a spending limit indication 610.

A change limit button 613, when selected, enables the user to revise the monetary amount of the spending limit for one or more of the group members.

Figure 7:
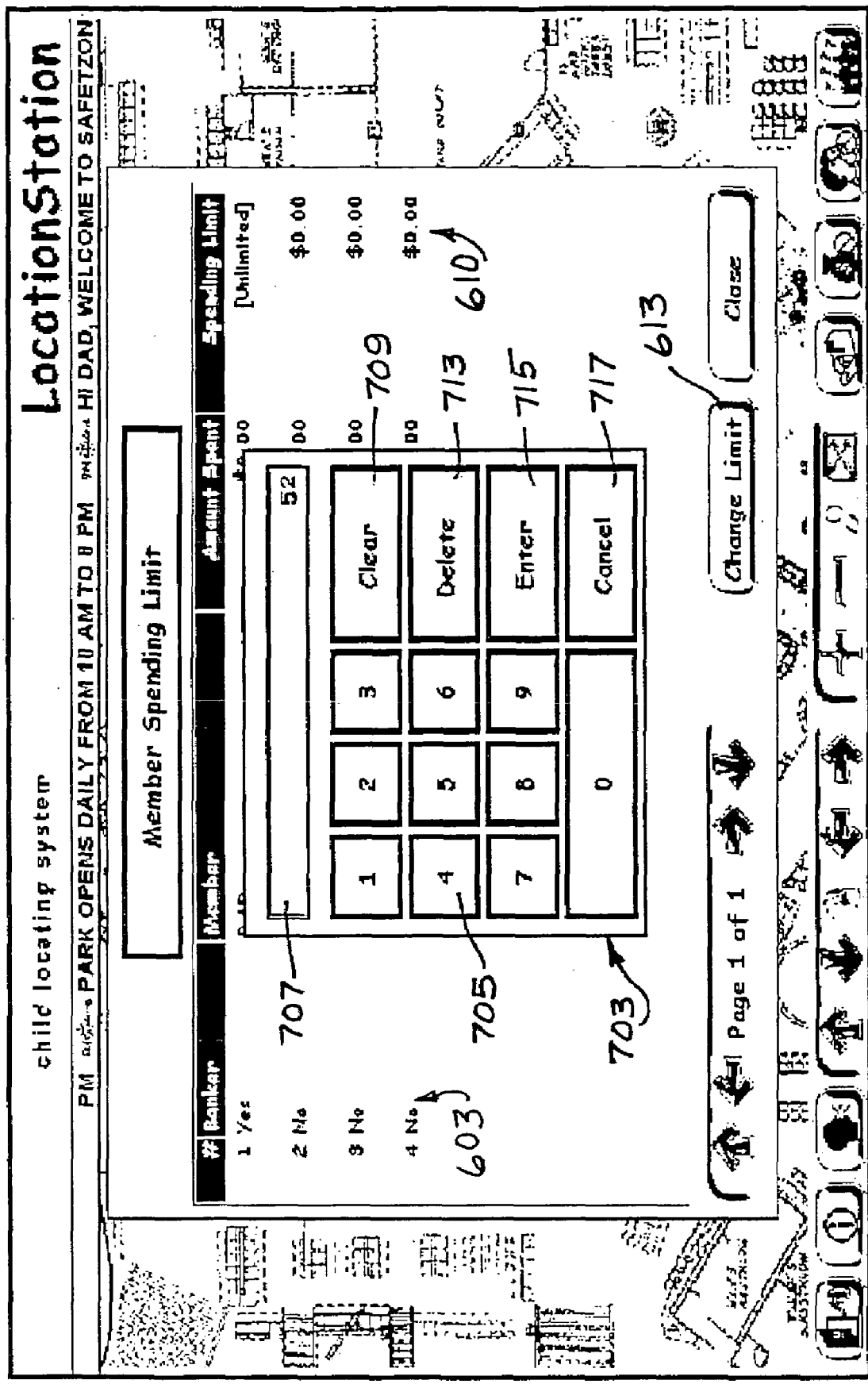

Referring now to FIG. 7, a drop down number pad 703 appears on the member spending limit screen 601 when the change limit button 613 is selected. The number pad 703 includes a set of tin number buttons such as a button 705. The pad 703 also includes a display 707 of the spending limit amount. There is also included a clear button 709, a delete button 713, an enter button 715 and a cancel button 717. In this manner, the user can enter new spending limits for one or more of the group members.

Figure 8:
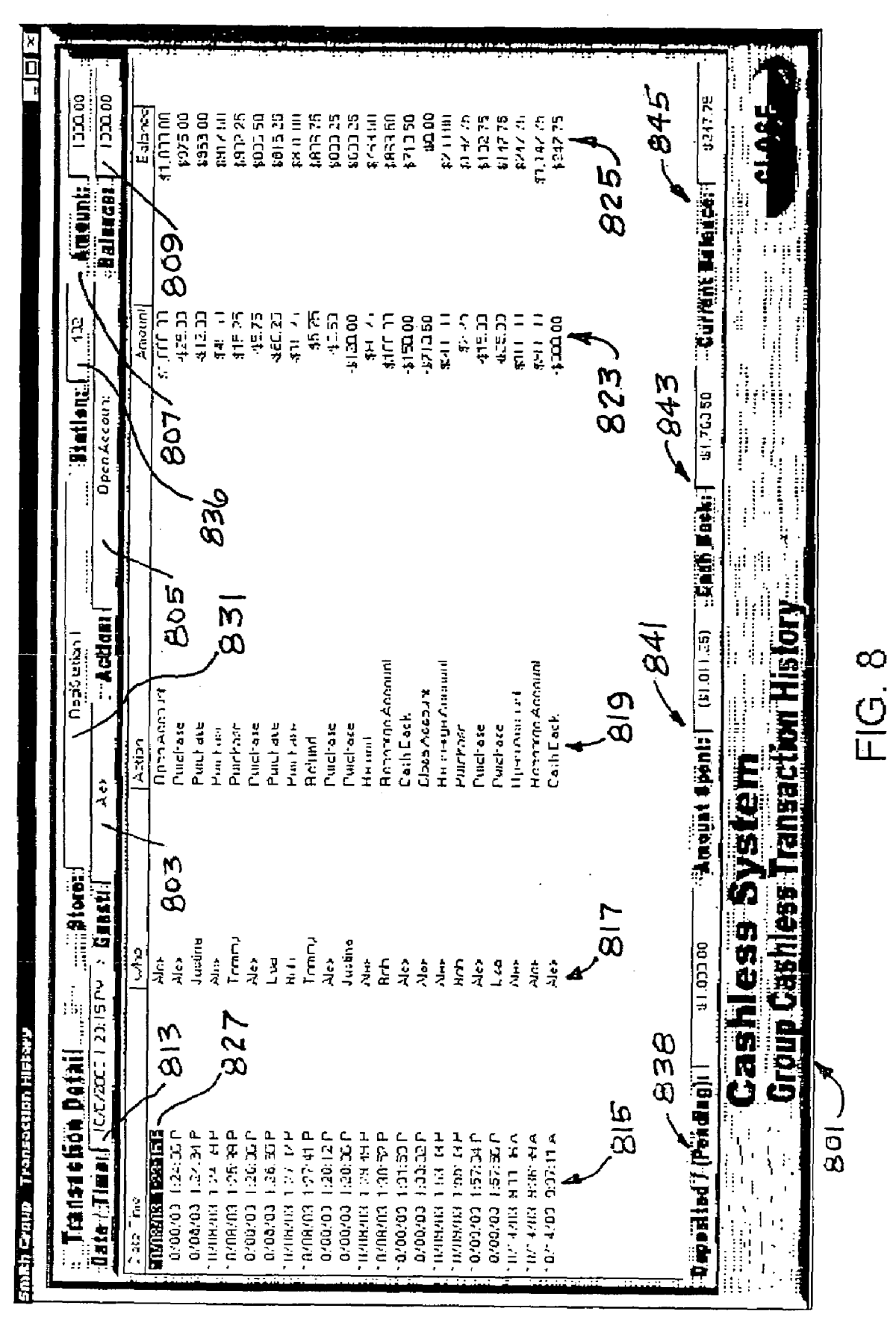

As shown in FIG. 8, a group cashless transaction history screen 801 includes a display of a guest indication 803 to designate the name of the guests or group. The action indication 805 designates whether or nor the account is open. An amount indication 807 displays the amount of a transaction, and a balance indication 809 displays the balance for the account history as of that particular transaction.

A date/time indication 813 is for a specific transaction being requested by the user. A date/time list indication 815 lists all of the transactions for this particular group transaction history. The screen 801 also displays the group members individually making the transactions at the indication 817. At an action indication 819, the type of action taking place at each transaction is displayed. These transactions can be a "purchase," a "cashback," and others. An amount list indication 823 shows the amount of each one of the transactions in the transaction history. A balance list indication list 825 provides the outstanding balance at the time of each individual transaction.

In order to make an inquiry as to an individual transaction, the date/time for a particular transaction may be highlighted such as at the highlighted indication 827 so that it will appear in the date/time box 813 to provide the information concerning the transaction at the indications 803, 805, 807 and 809, Additionally, a store indicating 831 provides the information as to where the transaction occurred. Also, the station where the transaction was registered is indicated at 836.

A deposited/pending indication 838 indicates the total amount deposited. An amount spent indication 841 provides an indication of the total amount spent for the group, and a cashback indication 843 indicates how much money would be refunded to the group if the account should close at the time of the inquiry. A current balance indication is shown at 845.

While particular embodiments of the present invention have been disclosed, it is to be understood that various different modifications and combinations are possible and are contemplated within the true spirit and scope of the disclosed embodiments and the appended claims. There is no intention, therefore, of limitations to the exact disclosure herein presented.

What is claimed is:

1. A method of communication for a confined area of a facility employing a member locating system having a group of location stations distributed throughout the confined area, comprising:

providing a transmitter to each member of a group for providing group member personal identification information to the member locating system as the members move about the confined area for tracking the location of the members and for facilitating cashless spending throughout the confined area, wherein members of the group may be located using one of the location stations;

receiving personal identification information of group members into at least one station of a set of stations distributed throughout the confined area;

receiving monetary deposit information for the group;

receiving transaction information from at least one of a group of cashless stations distributed throughout the confined area;

scanning the transmitter of one of the group members at the cashless station to receive group member personal identification information from the transmitter located near the cashless station to complete the transaction being made by the group member at the cashless station;

creating transaction reports; and receiving account information at the cashless station in response to the group member personal identification information from the transmitter located near the cashless station as the transaction is being completed by the group member.

2. A method according to claim 1, further including receiving spending limit information for each member.

3. A method according to claim 2, further including receiving spending limit change information.

4. A method according to claim 1, further including determining the total amount of cash spent and displaying said total amount.

5. A method according to claim 1, further including determining the amount of the cash to be returned to the group.

6. A system of communication for a confined area of a facility employing a member locating system having a group of location stations distributed throughout the confined area, comprising:

a transmitter for each member of a group for providing group member personal identification information to the member locating system as the members move about the confined area for tracking the location of the members and for facilitating cashless spending throughout the confined area, wherein members of the group may be located using one of the location stations;

means for receiving personal identification information of group members into at least one station of a set of stations distributed throughout the confined area;

means for receiving monetary deposit information for the group;

means for receiving transaction information from at least one of a group of cashless stations distributed throughout the confined area;

means for scanning the transmitter of one of the group members at the cashless station to receive group member personal identification information from the transmitter located near the cashless station to complete the transaction being made by the group member at the cashless station;

means for creating transaction reports; and means for receiving account information at the cashless station in response to the group member personal identification information from the transmitter located near the cashless station as the transaction is being completed by the group member.

7. A system according to claim 6, further including means for receiving spending limit information for each member.

8. A system according to claim 7, further including means for receiving spending limit change information.

9. A system according to claim 6, further including means for determining the total amount of cash spent and means for displaying said total amount.

10. A system according to claim 6, further including means for determining the amount of the cash to be returned to the group.

11. A software system of communication for a confined area of a facility employing a member locating system having a group of location stations distributed throughout the confined area, comprising:

a module for assigning a transmitter to each member of a group for providing group member personal identification information to the member locating system as the members move about the confined area for tracking the location of the members and for facilitating cashless spending throughout the confined area, wherein members of the group may be located using one of the location stations;

a module for receiving personal identification information of group members into at least one station of a set of stations distributed throughout the confined area;

a module for receiving monetary deposit information for the member group;

a module for receiving transaction information from at least one of a group of cashless stations distributed throughout the confined area;

a module for scanning the transmitter of one of the group members at the cashless station to receive group member personal identification information from the transmitter located near the cashless station to complete the transaction being made by the group member at the cashless station;

a module for creating transaction reports; and a module for receiving account information at the cashless station in response to the group member personal identification information from the transmitter located near the cashless station as the transaction is being completed by the group member.

12. A software system according to claim 11, further including module for receiving spending limit information for each member.

13. A software system according to claim 12, further including module for receiving spending limit change information.

14. A software system according to claim 11, further including module for determining the total amount of cash spent and module for displaying said total amount.

15. A software system according to claim 11, further including module for determining the amount of the cash to be returned to the group.

16. A method of communication for a facility, comprising:

providing a transmitter to an individual for transmissions confined within the facility;

receiving personal identification information of the individual into at least one of a set of stations distributed throughout the facility;

receiving monetary deposit information for the individual;

receiving transaction information from at least one cashless station located within the facility;

scanning the transmitter with the individual physically located at the cashless station located within the facility;

creating transaction reports in response to the individual making cashless purchases at cashless stations located within the facility; and receiving account information at the cashless station via the transmitter.

17. A software system of communication for a facility, comprising:

a module for assigning a transmitter to an individual for transmissions confined within the facility;

a module for receiving personal identification information of the individual into at least one of a set of stations distributed throughout the facility;

a module for receiving monetary deposit information for the individual;

a module for receiving transaction information from at least one cashless station located within the facility;

a module for scanning the transmitter with the individual physically located at the cashless station located within the facility;

a module for creating transaction reports in response to the individual making cashless purchases at cashless stations located within the facility; and a module for receiving account information at the cashless station via the transmitter.

18. A system of communication for a facility, comprising:

a transmitter for an individual for transmissions confined within the facility;

means for receiving personal identification information of the individual into at least one of a set of stations distributed throughout the facility;

means for receiving monetary deposit information for the individual;

means for receiving transaction information from at least one cashless station located within the facility;

means for scanning the transmitter with the individual physically located at the cashless station located within the facility;

means for creating transaction reports in response to the individual making cashless purchases at cashless stations located within the facility; and means for receiving account information at the cashless station via the transmitter.

19. A method of communication for a facility employing a member locating system having a group of location stations distributed throughout the facility area, comprising:

providing a transmitter to each of a first member and other members of a group for providing group member personal identification information to the member locating system as the members move about the facility for tracking the location of the members and for facilitating cashless spending by the first member throughout the facility, wherein the first member may locate the other members of the group using one of the location stations;

receiving personal identification information of group members into at least one station of a set of stations distributed throughout the facility;

receiving monetary deposit information for the first member;

receiving transaction information from at least one of a group of cashless stations distributed throughout the facility;

scanning the transmitter of the first member at the cashless station to receive group member personal identification information from the transmitter located near the cashless station to complete the transaction being made by the first member at the cashless station;

creating transaction reports; and receiving account information at the cashless station in response to the group member personal identification information from the transmitter located near the cashless station as the transaction is being completed by the first member.

20. A system of communication for a facility employing a member locating system having a group of location stations distributed throughout the facility area, comprising:

a transmitter for each of a first member and other members of a group for providing group member personal identification information to the member locating system as the members move about the facility for tracking the location of the members and for facilitating cashless spending by the first member throughout the facility, wherein the first member may locate the other members of the group using one of the location stations;

means for receiving personal identification information of group members into at least one station of a set of stations distributed throughout the facility;

means for receiving monetary deposit information for the first member;

means for receiving transaction information from at least one of a group of cashless stations distributed throughout the facility;

means for scanning the transmitter of the first member at the cashless station to receive group member personal identification information from the transmitter located near the cashless station to complete the transaction being made by the first member at the cashless station;

means for creating transaction reports; and means for receiving account information at the cashless station in response to the group member personal identification information from the transmitter located near the cashless station as the transaction is being completed by the first member.

21. A software system of communication for a facility employing a member locating system having a group of location stations distributed throughout the facility area, comprising:

a module for assigning a transmitter to each of a first member and other members of a group for providing group member personal identification information to the member locating system as the members move about the facility for tracking the location of the members and for facilitating cashless spending by the first member throughout the facility, wherein the first member may locate the other members of the group using one of the location stations;

a module for receiving personal identification information of group members into at least one station of a set of stations distributed throughout the facility;

a module for receiving monetary deposit information for the first member;

a module receiving transaction information from at least one of a group of cashless stations distributed throughout the facility;

a module for scanning the transmitter of the first member at the cashless station to receive group member personal identification information from the transmitter located near the cashless station to complete the transaction being made by the first member at the cashless station;

a module for creating transaction reports; and a module for receiving account information at the cashless station in response to the group member personal identification information from the transmitter located near the cashless station as the transaction is being completed by the first member.

* * * * *